United States Patent [19]

Fleming

[11] Patent Number: 4,693,883
[45] Date of Patent: Sep. 15, 1987

[54] AMMONIA UTILIZATION PROCESS
[75] Inventor: Donald K. Fleming, Park Ridge, Ill.
[73] Assignee: Institute of Gas Technology, Chicago, Ill.
[21] Appl. No.: 813,919
[22] Filed: Dec. 27, 1985
[51] Int. Cl.$^4$ .............................................. C01C 1/02
[52] U.S. Cl. .................................. 423/648 R; 252/373; 423/352; 423/415 A
[58] Field of Search ............... 423/352, 648 R, 415 A; 252/373

[56] References Cited

U.S. PATENT DOCUMENTS

| | | | |
|---|---|---|---|
| 2,529,630 | 11/1950 | Reichl | 423/415 A |
| 2,741,549 | 4/1956 | Russell | 423/648 R |
| 2,838,388 | 6/1958 | Carkeek et al. | 423/415 A |
| 3,432,265 | 3/1969 | McCallister et al. | 423/352 |
| 3,451,783 | 6/1969 | Collins | 55/16 |
| 3,577,338 | 5/1971 | Gifford, II | 423/648 R |
| 3,773,912 | 11/1973 | Spangler | 423/237 |
| 4,032,618 | 6/1977 | Matthews | 423/648 R |
| 4,049,782 | 9/1977 | Wöhler et al. | 423/352 |
| 4,143,122 | 3/1979 | Laufhütte et al. | 423/648 R |
| 4,233,275 | 11/1980 | Kimura et al. | 423/237 |
| 4,265,868 | 5/1981 | Kamody | 423/415 A |

Primary Examiner—John Doll
Assistant Examiner—Wayne A. Langel
Attorney, Agent, or Firm—Thomas W. Speckman; Ann W. Speckman

[57] ABSTRACT

An ammonia utilization process substantially eliminates by-product ammonia gas produced during hydrogen forming gasification processes by recycling sour water stripper off-gas comprising ammonia to a hydrogen forming gasifier wherein by-product ammonia gas is converted to desired hydrogen product gas and nitrogen.

18 Claims, 1 Drawing Figure

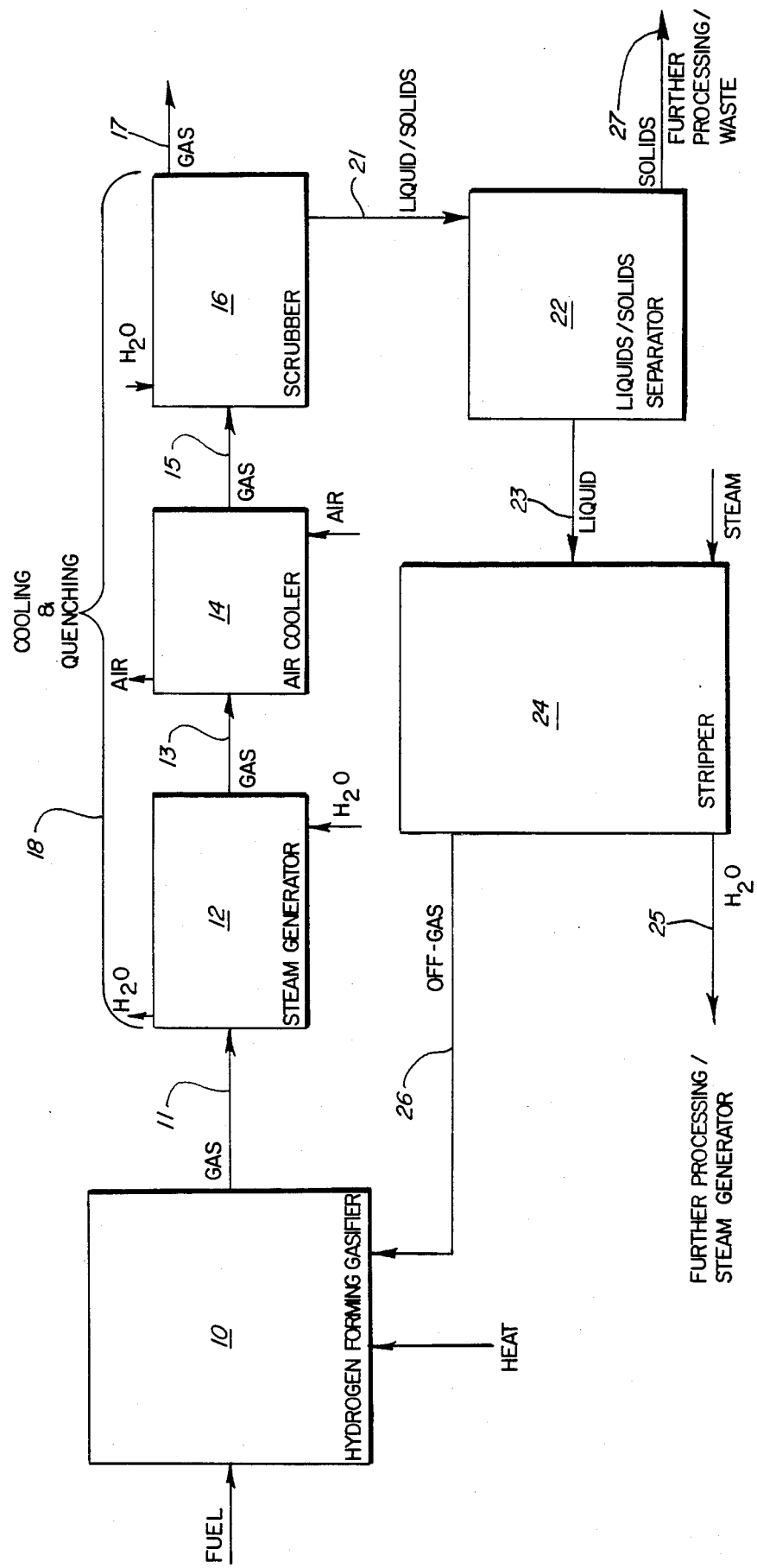

AMMONIA UTILIZATION PROCESS

BACKGROUND OF THE INVENTION

1. Field of the Invention

This invention relates to an ammonia utilization process which substantially reduces by-product ammonia gas present in product gas from gasification of organic carbonaceous materials and concomitantly enhances the hydrogen content of the product gas by recycling sour water stripper off-gas comprising substantial quantities of ammonia gas to the primary hydrogen forming carbonaceous material gasifier wherein the ammonia is converted to nitrogen and hydrogen.

2. Description of the Prior Art

In many energy conversion systems, particularly those in which carbonaceous materials, such as coal, oil shale, peat, or the like, are converted to product gases, undesirable by-product gases are formed and released. The composition and quantity of such undesirable by-product gases depends upon the process and the composition of the carbonaceous material converted. Undesirable by-product gases typically comprise sulfur compounds including sulfur oxides and hydrogen sulfide, ammonia, carbon dioxide and phenols. High levels of toxic by-products preclude the release of these by-product gases into the atmosphere without extensive treatment and purification. Subsequent treatment of by-product gases is expensive, and significantly reduces the overall efficiency of the energy conversion system.

Product gases discharged from a hydrogen forming carbonaceous material gasifier undergo various cooling and scrubbing processes to separate purified product gas comprising primarily hydrocarbons and hydrogen. It is customary to water scrub the product gases to remove ammonia prior to acid gas cleaning. Undesirable by-product gases, including sour gases, may be dissolved in an aqueous scrubbing agent and thereby separated from desirable product gas. The by-product gases dissolved in aqueous scrubbing agent, referred to as sour water, may then be stripped from the water as gases. It is this mixture of by-product gases which is referred to as sour water stripper off-gas. Many of the prior art energy conversion systems attempt to recover ammonia from the sour water stripper off-gas. Ammonia recovery from off-gas is expensive and a very energy consumptive process, and, in most instances, the quantity of ammonia recovered simply does not justify the energy consumption, particularly in smaller scale systems, and when a relatively low fraction of nitrogen in the substrate material was converted to ammonia.

In many energy conversion systems, by-product ammonia in the gaseous effluent is reduced by injecting the sour water stripper off-gas, comprising primarily ammonia, hydrogen sulfide, sulfur oxides and carbon dioxide, into the burner section of a sulfur plant, such as a Claus sulfur recovery plant. In this system, some hydrogen sulfide and sulfur oxides are converted to desirable elemental sulfur product, and ammonia is destroyed. Injection of sour water stripper off-gas into a Claus sulfur burner may be convenient, but it also suffers serious drawbacks. By-product ammonia in the sour water stripper off-gas represents a significant oxygen demand in the sulfur plant, thereby causing air/sulfur ratio regulation problems, and causing heat release in the system. Additionally, unburned ammonia may foul downstream catalyst beds, while overburned ammonia, which forms nitric oxide, nitrates and nitrites, may also cause serious operating problems. Furthermore, by-product carbon dioxide in sour water stripper off-gas dilutes the sulfur content of the Claus plant feed gas, impairs sulfur recovery, and reduces the efficiency of downstream tail gas treatment.

U.S. Pat. No. 4,143,122 discloses the conversion of by-product gases comprising sulfur-containing and nitrogen-containing compounds in a sulfur producing plant with its tail gases being fed to a catalytic ammonia decomposition plant. In this process, ammonia is decomposed to form nitrogen and active hydrogen. Active hydrogen combines with sulfur-containing compounds to form hydrogen sulfide which may be separated and recycled to the sulfur producing plant, while the remaining hydrogen-containing gas is suitable for use as fuel for undergrate firing.

U.S. Pat. No. 3,773,912 teaches the catalytic conversion of ammonia to nitrogen and hydrogen before a gas stream comprising hydrogen sulfide and ammonia undergo a Claus type sulfur recovery process.

U.S. Pat. No. 4,233,275 teaches purification of a coal gas containing hydrogen sulfide and ammonia wherein high temperature, high pressure, raw coal gas is cooled and expanded for ammonia decomposition and the expanded coal gas heated for further ammonia decomposition.

SUMMARY OF THE INVENTION

According to the process of the present invention, sour water stripper off-gas is recycled to the primary hydrogen forming carbonaceous material gasifier, wherein it is converted to nitrogen and hydrogen, thereby enhancing the hydrogen content of the product gas. This process provides effective utilization of ammonia in an energy conversion process with recovery of hydrogen values. The process is energy efficient and may be conveniently adapted for use in various types of existing energy conversion systems.

Raw product gas produced by a hydrogen forming carbonaceous material gasifier typically comprises primarily hydrocarbons, carbon monoxide, and hydrogen with smaller amounts of carbon dioxide, ammonia, hydrogen sulfide, sulfur oxides, cyanate and thiocyanate, and dust. According to the process of the present invention, raw product gas discharged from the hydrogen forming carbonaceous material gasifier undergoes a cooling and quenching process. This cooling and quenching process, according to one embodiment, entails three stages. In the first stage, hot product gases are cooled by indirect thermal exchange with a liquid such as water. A shell and tube energy recovery system is typically employed. In such a system, the hot product gas is conveyed through relatively small diameter tubes or pipes immersed in water. Thermal energy is exchanged from hot gases to the circulating water, raising steam for use elsewhere in the overall process.

Product gases are then conveyed to a second stage indirect air cooler wherein thermal exchange occurs between the hot product gas and cooler circulating air. Product gases are next conveyed to a third stage of the cooling and quenching process, an aqueous scrubber. The scrubber typically features a Venturi design, but other aqueous scrubbers known to the art are suitable for use in this process. Product gases are washed with a large volume of aqueous solution, typically water, and soluble by-product gases are dissolved in the water. Desirable hydrocarbon, carbon monoxide and hydrogen gases are insoluble in water and are discharged from the scrubber along with smaller quantities of hydrogen sulfide and carbon dioxide. Either one of the cooling stages may be omitted if sufficient cooling is achieved utilizing a single stage cooling process.

Aqueous scrubbing agent containing dissolved by-product gases discharged from the scrubber is commonly referred to as sour water and contains dissolved ammonia, small amounts of dissolved hydrogen sulfide, carbon dioxide, and trace amounts of dust, cyanate and thiocyanate. According to the process of this invention, the sour water is conveyed to a solids/liquid separator wherein solids are removed and may undergo further processing or may be disposed of as waste products.

The separated sour water liquid is conveyed to a stripper, typically comprising a packed tower equipped with a heating means or reboiler. As sour water passes through the packed tower, it is heated and dissolved gases are released. Heat may be provided by hot water or steam which permeates the packing of the tower and provides sufficient heat to release the solubilized gases. Water discharged from the stripper is essentially free of by-product gases and no longer "sour", and may be processed to provide water for recycle to the aqueous scrubber, or for use elsewhere in the overall system.

Off-gas discharged from the sour water stripper comprises primarily ammonia, sulfur compounds including small amounts of hydrogen sulfide and sulfur oxides, and carbon dioxide. According to the process of the present invention, sour water stripper off-gas is recycled to the primary hydrogen forming carbonaceous material gasifier, wherein the ammonia is cracked to form additional hydrogen product gas and nitrogen. If the primary carbonaceous material gasifier is a single stage fluidized bed gasifier, the sour water stripper ammonia containing off-gas is preferably mixed with the steam and/or recycle gas used for fluidization, and injected into the gasifier as fluidizing medium. If the primary carbonaceous material gasifier is an entrained flow gasifier operating at low pressures, the sour water stripper ammonia containing off-gas is preferably mixed and injected with the steam. If the primary carbonaceous material gasifier is a high pressure entrained flow gasifier, the sour water stripper ammonia containing off-gas may either be dissolved in the water or injected into the pressurized slurry. In an energy conversion system utilizing a multi-stage hydrogasifier, sour water stripper ammonia containing off-gas is preferably injected at the base of the gasifier with the incoming steam.

It is an object of the present invention to provide a process for utilization of by-product ammonia gas by conversion to additional hydrogen product gas utilizing conventional energy conversion process equipment by recycling sour water stripper ammonia containing off-gas to the primary hydrogen forming carbonaceous material gasifier.

BRIEF DESCRIPTION OF THE DRAWING

The above mentioned and other features of this invention, and the manner of obtaining them, will become more apparent and the invention will be best understood by reference to the following description of a preferred embodiment of the invention read in conjunction with the accompanying drawing which shows a highly schematic flow diagram of the process of the present invention.

DESCRIPTION OF A PREFERRED EMBODIMENT

The process of the present invention may be utilized in any energy conversion system which incorporates a hydrogen forming gasifier. Hydrogen forming gasifier 10 may be of any design known to the art which converts organic carbonaceous material, such as coal, oil shale, peat, and other organic carbonaceous material, to gaseous and/or liquid products. Gasifier 10 may comprise a moving bed gasifier, fluidized bed gasifier, entrained flow gasifier operating at low or high pressure, a multi-stage hydrogasifier, or any other hydrogen forming gasifier known to the art.

As organic carbonaceous material is thermally decomposed in gasifier 10, product gas is withdrawn through product gas withdrawal conduit 11. Raw product gas withdrawn from gasifier 10 is typically at a temperature of about 700° to about 2800° F. The hot gasifier product gas undergoes a cooling and quenching process designated in the FIGURE generally as 18, preferably comprising three stages, which cools the hot gasifier product gas and separates hydrocarbon, carbon monoxide and hydrogen product gases from undesirable by-product gases, principally ammonia and sulfur containing gases.

The first stage of one preferred embodiment of the cooling and quenching process 18 shown in the figure comprises thermal exchanger 12. A shell and tube energy recovery system is typically utilized, and is preferred. In a shell and tube system, tubes or pipes carrying hot gasifier product gases are suspended in cooler circulating liquid, typically water. Heat radiates from the hot gases through the tubes and is absorbed by the cooler circulating water. The gasifier product gases are thus cooled as the water is heated for subsequent utilization and steam generation, for heating purposes, or the like.

Gas discharged from thermal exchanger 12 is conveyed through product gas conduit 13 to the second stage of the cooling and quenching process, cooler 14. Cooler 14 preferably comprises an air cooler and many types of air coolers known to the art will be recognized as suitable for use with the process of the present invention. Product gas enters air cooler 14 at a temperature of approximately 250° to 450° F. and is further cooled in cooler 14 to the greatest extent practicable, preferably to about 100° to 250° F. Either of these cooling stages may be omitted, or any other suitable cooling process may be substituted, as long as the product gas is cooled to temperatures of from about 100° to about 250° F.

Cooled gasifier product gas is withdrawn from cooler 14 through product gas conduit 15 and conveyed to the third stage of cooling and quenching process 18, scrubber 16. Scrubber 16 preferably employs a Venturi or pan system to scrub the cooled product gas with a large volume of scrubbing agent, preferably water. As the gasifier product gas is scrubbed, undesirable by-products including ammonia and sulfur containing compounds are solubilized in the scrubbing agent. Desirable hydrocarbon, carbon monoxide and hydrogen product gas is highly insoluble in the scrubbing agent. Product gas comprising principally hydrocarbon, carbon monoxide and hydrogen gases is withdrawn from scrubber 16 through product gas conduit 17 and conveyed for further processing or direct utilization.

Aqueous scrubbing agent containing dissolved by-product gases collected from scrubber 16 is commonly referred to as sour water. By-product gases dissolved in the scrubbing agent include ammonia, small amounts of hydrogen sulfide, sulfur oxides and carbon dioxide, and trace amounts of dust, cyanate, thiocyanate, and hydrochloric acid. Sour water is conveyed from scrubber 16 through discharge conduit 21 to solids/liquid separator 22. Solid particulate matter including dust and other insolubles is separated and discharged through solids conduit 27 and conveyed for further processing or disposal. Sour water is conveyed from solids/liquid separator 22 through liquids conduit 23 to gas stripper 24.

Gas stripper 24 preferably comprises a tower or a series of towers, through which the sour water is conveyed in thermal transfer with a heat source, such as steam from a reboiler or similar apparatus. As the sour water flowing through the tower is heated the dissolved gases are driven off or stripped from the liquid. Generally, steam at about 300° to about 375° F. is used to provide in the order of about 1000 Btu/gal liquid. Gas stripper 24 may be a packed or pan tower, suitably such devices may be known to the art for thermal transfer to promote gas stripping from liquids. Sour water stripper off-gas is withdrawn from gas stripper 24 through off-gas conduit 26. The off-gas comprises primarily ammonia, sulfur compounds including hydrogen sulfide and sulfur oxides, and carbon dioxide. Sour water stripper off-gas is recycled through conduit 26 to the primary hydrogen forming carbonaceous material gasifier 10. Water discharged from stripper 24 through conduit 25 is no longer contaminated with undesirable ammonia and sulfur containing compounds and may be further processed using conventional equipment to provide aqueous scrubbing agent or other use in the plant.

Sour water stripper off-gas comprising ammonia and sulfur containing compounds may be injected in any suitable manner into primary carbonaceous material gasifier 10. Preferably, the sour water stripper off-gas is mixed with steam and/or recycle gas for injection into the carbonaceous material gasifier. Sour water stripper off-gas comprising primarily ammonia, with smaller quantities of sulfur compounds and carbon dioxide, is passed through the gasification reaction zone in carbonaceous material gasifier 10. When subjected to the carbonaceous material gasification temperature and pressure conditions in gasifier 10, ammonia is cracked to form nitrogen and hydrogen. The hydrogen formed in this manner enhances the hydrogen content of the final product gas.

In a single stage, ash agglomerating, fluidized bed coal gasifier operating at 1875° F. approximately 15 percent of the coal nitrogen appears in the gasifier off-gas as ammonia. The ammonia is almost quantitatively dissolved in the sour water and the free ammonia is almost quantatively stripped from the sour water for recycle to the coal gasifier. If 85 percent of the recycled ammonia is decomposed in the coal gasifier, as may be expected from the initial coal gasifier off-gas, the closed loop recycle of ammonia in the off-gas back to the hydrogen forming gasifier result in very high utilization and destruction of the produced ammonia so that very little of the coal nitrogen appears in the system discharge as ammonia. There should be no accumulation of products of the coal gasifier in the recycle loop according to the process of this invention. Substantially all coal nitrogen will appear in the system off-gas as molecular nitrogen with the exception of small amounts of fixed ammonia and traces of cyanate and thiocyanate. The hydrogen which normally would be fixed in the ammonia and consumed in a sulfur production plant, in the process of this invention, is available in the gasifier for reaction with organic cabonaceous feed material to form desired hydrocarbons or is added to the desired product gas.

The process of this invention provides a process for gasification of organic carbonaceous materials in a hydrogen forming gasifier improved by recycling gaseous ammonia recovered from the product gas of the gasifier back to the gasifier operated under organic carbonaceous material gasifying conditions forming a substantial amount of hydrogen and nitrogen from the ammonia. The improvement involves separating ammonia from product gas of the gasifier by dissolving it in an aqueous liquid forming sour water, separating the sour water from the gasifier product gas, separating gaseous ammonia from the sour water, and recycling the separated gaseous ammonia to the hydrogen forming gasifier forming a substantial amount of hydrogen and nitrogen from the ammonia, the additional hydrogen being available in the gasifier for hydrogasification or for release in the product gas as desirable hydrogen.

The process of this invention is one which utilizes ammonia from organic carbonaceous material hydrogasification product gas from a hydrogen forming gasifier by recycle of the ammonia gas to the hydrogen forming gasifier operated under organic carbonaceous material gasifying conditions to form a substantial amount of hydrogen and nitrogen from the ammonia. The ammonia is separated from the gasifier product gas by cooling and scrubbing the gasifier product gas with an aqueous liquid forming ammonia containing sour water. The gaseous ammonia is separated from the sour water and then recycled to the hydrogen forming gasifier operated under organic carbonaceous material gasifying conditions to form a substantial amount of hydrogen and nitrogen from the ammonia thereby utilizing the ammonia to produce useful hydrogen and concurrently preventing the discharge of ammonia to downstream processing steps which are hindered by the presence of the ammonia.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a process for gasification of organic carbonaceous materials in a hydrogen forming gasifier, the improvement comprising:
   separating ammonia from product gas of said gasifier by dissolving in an aqueous liquid forming sour water; separating said sour water from said gasifier product gas; separating gaseous ammonia from said sour water; and recycling said gaseous ammonia to said hydrogen forming gasifier operated under organic carbonaceous material gasifying conditions forming a substantial amount of hydrogen and nitrogen from said ammonia.

2. In a process of claim 1 wherein said gaseous ammonia is separated from said sour water by heat.

3. In a process of claim 2 wherein said heat is supplied by steam at about 300° to about 375° F.

4. In a process of claim 1 wherein said recycle gaseous ammonia is introduced into said gasifier as a fluidizing medium.

5. In a process of claim 1 wherein said recycle gaseous ammonia is dissolved in a fluid for recycle to said gasifier.

6. In a process of claim 1 wherein said recycle gaseous ammonia is injected into a pressurized slurry of said organic carbonaceous material for recycle to said gasifier.

7. In a process of claim 1 wherein said organic carbonaceous materials are selected from the group consisting of coal, oil shale and peat.

8. In a process of claim 1 wherein said separating of ammonia from product gas of said gasifier comprises first cooling said product gas followed by scrubbing with an aqueous scrubbing agent to form said sour water separate from product gas.

9. In a process of claim 1 wherein said gaseous ammonia is separated from said sour water by heat, said organic carbonaceous materials are selected from the group consisting of coal, oil shale and peat, and said separating of ammonia from product gas of said gasifier comprises first cooling said product gas followed by scrubbing with an aqueous scrubbing agent to form said sour water separate from product gas.

10. A process for ammonia utilization from organic carbonaceous material hydrogasification product gas from a hydrogen forming gasifier comprising the steps: producing ammonia containing sour water by cooling and scrubbing said gasifier product gas with an aqueous liquid; separating gaseous ammonia from said sour water; and recycling said gaseous ammonia to said hydrogen forming gasifier operated under organic carbonaceous material gasifying conditions forming a substantial amount of hydrogen and nitrogen from said ammonia.

11. A process for ammonia utilization of claim 10 wherein said gaseous ammonia is separated from said sour water by heat.

12. A process for ammonia utilization of claim 11 wherein said heat is supplied by steam at about 300° to about 375° F.

13. A process for ammonia utilization of claim 10 wherein said recycle gaseous ammonia is introduced into said gasifier as a fluidizing medium.

14. A process for ammonia utilization of claim 10 wherein said recycle gaseous ammonia is dissolved in a fluid for recycle to said gasifier.

15. A process for ammonia utilization of claim 10 wherein said recycle gaseous ammonia is injected into a pressurized slurry of said organic carbonaceous material for recycle to said gasifier.

16. A process for ammonia utilization of claim 10 wherein said organic carbonaceous materials are selected from the group consisting of coal, oil shale and peat.

17. A process for ammonia utilization of claim 10 wherein said separating of ammonia from product gas of said gasifier comprises first cooling said product gas followed by scrubbing with an aqueous scrubbing agent to form said sour water separate from product gas.

18. A process for ammonia utilization of claim 10 wherein said gaseous ammonia is separated from said sour water by heat, said organic carbonaceous materials are selected from the group consisting of coal, oil shale and peat, and said separating of ammonia from product gas of said gasifier comprises first cooling said product gas followed by scrubbing with an aqueous scrubbing agent to form said sour water separate from product gas.

* * * * *